US007948936B2

(12) United States Patent
Lohr et al.

(10) Patent No.: US 7,948,936 B2
(45) Date of Patent: May 24, 2011

(54) QUALITY-OF-SERVICE (QOS)-AWARE SCHEDULING FOR UPLINK TRANSMISSION ON DEDICATED CHANNELS

(75) Inventors: Joachim Lohr, Darmstadt (DE); Dragan Petrovic, Darmstadt (DE); Eiko Seidel, Darmstadt (DE)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 10/583,671

(22) PCT Filed: Sep. 23, 2005

(86) PCT No.: PCT/EP2005/010331
§ 371 (c)(1),
(2), (4) Date: Nov. 14, 2006

(87) PCT Pub. No.: WO2006/037492
PCT Pub. Date: Apr. 13, 2006

(65) Prior Publication Data
US 2007/0121542 A1 May 31, 2007

(30) Foreign Application Priority Data

Oct. 1, 2004 (EP) .................................... 04023418

(51) Int. Cl.
*H04W 28/16* (2009.01)
*H04W 74/04* (2009.01)
(52) U.S. Cl. .................. 370/329; 370/230; 370/395.21; 370/395.43; 455/452.2
(58) Field of Classification Search ................. 370/232, 370/252, 253, 328, 329, 330, 475, 229, 230.1, 370/340, 341, 342, 338, 349, 352, 395.4, 370/412, 441, 455, 468, 479, 522, 523, 230, 370/348, 35, 2, 395.21, 395.41–395.43; 455/500, 455/515, 450–452.2; 709/227–229
See application file for complete search history.

(56) References Cited

U.S. PATENT DOCUMENTS
6,728,365 B1    4/2004  Li et al.
(Continued)

FOREIGN PATENT DOCUMENTS
JP    2003-008635    1/2003
(Continued)

OTHER PUBLICATIONS

NEC, "Efficient rate scheduling to support multiple transport channels," TSG-RAN Working Group 1, meeting #35, Lisbon, Portugal, November 17-21, 2003, 4 pages total.
(Continued)

*Primary Examiner* — Aung S Moe
*Assistant Examiner* — Habte Mered
(74) *Attorney, Agent, or Firm* — Dickinson Wright PLLC

(57) ABSTRACT

The invention relates to a method for scheduling in a mobile communication system where data of priority flows is transmitted by mobile terminals via dedicated uplink channels to a base station. Each mobile terminal transmits at least data of one priority flow via one of the dedicated uplink channels. Moreover, the invention relates to a base station for scheduling priority flows transmitted by mobile terminals via dedicated uplink channels to the base station. Further, a mobile terminal transmitting at least data of one priority flow via a dedicated uplink channel to a base station is provided. In order to optimize base station controlled-scheduling functions in a mobile communication system the invention proposes to provide the scheduling base station with QoS requirements of individual priority flows transmitted via an uplink dedicated channel and to adapt the mobile terminals to indicate the priority flows of which data is to be transmitted to the base stations for scheduling.

39 Claims, 9 Drawing Sheets

U.S. PATENT DOCUMENTS

| | | | |
|---|---|---|---|
| 6,747,962 B2 | 6/2004 | Lintulampi et al. | |
| 6,760,344 B2 | 7/2004 | Mizell et al. | |
| 6,944,473 B2* | 9/2005 | Irwin et al. | 455/550.1 |
| 6,947,750 B2* | 9/2005 | Kakani et al. | 455/452.2 |
| 7,023,825 B1* | 4/2006 | Haumont et al. | 370/338 |
| 7,336,632 B2* | 2/2008 | Cheng et al. | 370/329 |
| 2002/0159411 A1 | 10/2002 | Airy et al. | |
| 2002/0181436 A1 | 12/2002 | Mueckenheim | |
| 2003/0012220 A1 | 1/2003 | Kim et al. | |
| 2004/0102202 A1 | 5/2004 | Kumaran et al. | |
| 2004/0228313 A1* | 11/2004 | Cheng et al. | 370/342 |
| 2005/0073953 A1* | 4/2005 | Kekki | 370/230 |
| 2005/0220049 A1* | 10/2005 | Zhang et al. | 370/329 |
| 2005/0249133 A1* | 11/2005 | Terry et al. | 370/278 |
| 2006/0019671 A1* | 1/2006 | Chemiakina et al. | 455/452.2 |
| 2007/0073805 A1* | 3/2007 | Jorgensen | 709/203 |

FOREIGN PATENT DOCUMENTS

| | | |
|---|---|---|
| WO | 0163855 | 8/2001 |
| WO | 02065675 | 8/2002 |
| WO | 03053010 | 6/2003 |
| WO | 03085903 | 10/2003 |
| WO | 2004049591 | 6/2004 |

OTHER PUBLICATIONS

3GPP TS 25.401 V6.2.0 (Dec. 2003), Technical Specification, 3rd Generation Partnership Project; Technical Specification Group Radio Access Network; "UTRAN overall description," (Release 6), pp. 1-44.

Japanese Office Action dated Nov. 10, 2010 in JP 2009-198523 with the English translation thereof.

Japanese Office Action dated Nov. 10, 2010 in JP 2007-133008 with the English translation thereof.

PCT International Search Report dated Nov. 11, 2005.

Panasonic: "Uplink power signalling information for the scheduling," 3GPP TSG RAN1 #38BIS; Seoul, Korea, Sep. 20-24, 2004, 'Online! Sep. 16, 2004, pp. 1-3, XP002353453, Internet, Retrieved from the Internet: URL: http://www.3gpp.org/ftp/tsg_ran/WG1_RL 'retrieved on Nov. 10, 2004.

3GPP TSG-RAN WG1 #36—QUALCOMM Europe: "TP on E-DCH System Performance—Traffic Models—Boosted Mode" R1-040275, 'Online! Feb. 13, 2004, pp. 1-7, XP002320488, Malaga, Spain—Feb. 16-20, 2004, Retrieved from the Internet: URL: http://www.3gpp.org/ftp/tsg_ran/WG1_RL1/TSGR1_36/Docs/Zips/> retrieved on Mar. 8, 2005.

European Official Communication dated Mar. 9, 2007.

Japanese Office Action dated Mar. 20, 2007 with English translation.

NEC: "Per-Cell, Per-UE, Per-MAC-d Flow basis Scheduling Signaling in Enhanced Uplink—Agenda Item 4.3.1 Scheduler Requirement and principles", TSG-RAN Working Group 2, Cannes, France, Jun. 21-24, 2004, Rd-041294, Jun. 18, 2004, pp. 1-6.

NEC: "Per Priority Queue basis Rate Scheduling in Enhanced Uplink—7.3 Scheduling Schmemes", TSG-RAN Working Group 1#38bis, Seoul, Korean, Sep. 20-24, 2004, R1-041125, Sep. 17, 2004, p. 1-3.

Nokia: "QoS and Scheduling Principles is HSUPA", 3GPP TSG-RAN WG2#43, Prague, Czech, Aug. 16-20, 2004, Rd-041519, Aug. 16, 2004, pp. 1-3.

Infineon: "Approach for TFC configuration to support efficient scheduling" 3GPP TSG-RAN WG2 Meeting #42, Montreal, Canada, May 10-14, 2004, R2-040959, May 10, 2004, pp. 1-3.

Ericsson: "E-DCH Transport Formats—Agenda Item 7.6" TSG-RAN WG1#38bis, Seoul, Korea, Sep. 20-24, R1-041183, Sep. 17, 2004, pp. 1-3.

Fujitsu: "Signalling framework for enhanced uplink scheduling", Internet Citation, Aug. 16, 2004, pp. 1-3.

3GPP TS25.309 v.6.0.0, Technical Specification Group Radio Access Network; FDD Enhanced Uplink, Overall description, Stage 2, Release 6, Sep. 2004, pp. 1-12.

D. Chase, "Code Combining—A Maximum-Likelihood Decoding Approach for Combining an Arbitrary Number of Noisy Packets," IEEE Transactions on Communications, vol. 33, No. 5, May 1985, pp. 385-393.

3GPP TS25.401 v6.1.0, Technical Specification, $3^{rd}$ Generation Partnership Project, Technical Specification Group Radio Access Network, UTRAN Overall Description (Release 6), www.3GPP.com, Jun. 2003, pp. 1-44.

3GPP TR25.896 v6.0.0, Technical Specification, $3^{rd}$ Generation Partnership Project, Technical Specification Group Radio Access Network, Feasibility Study for Enhanced Uplink for UTRA FDD (Release 6), www.3GPP.com, Mar. 2004, pp. 1-179.

"Scheduled and Autonomous Mode Operation for the Enhanced Uplink," 3GPP TSG RAN WG1#31, Tdoc R1-03-0284, Tokyo, Japan, Feb. 17-20, 2003, pp. 1-7.

"HARQ Structure," 3GPP TSG-RAN WG1#31, Tdoc R1-030247, Tokyo, Japan, Feb. 18-21, 2003, pp. 1-3.

3GPP TS 25.321 v6.1.0, Technical Specification, $3^{rd}$ Generation Partnership Project, Technical Specification Group Radio Access Network, Medium Access Control (MAC) Protocol Specification (Release 6), www.3GPP.com, Mar. 2004, pp. 1-61.

3GPP TS23.107 v6.1.0, Technical Specification, $3^{rd}$ Generation Partnership Project, Technical Specification Group Services and System Aspects, Quality of Service (QoS) Concept and Architecture (Release 6), www.3GPP.com, Mar. 2004, pp. 1-41.

Draft3GPP TR 25.897 v0.3.1, Technical Specification Group Radio Access Network, Feasibility Study on the Evolution of UTRAN Architecture (Release 6), www.3GPP.com, Aug. 2003, pp. 1-31.

3GPP TS25.401 v6.4.0, Technical Specification Group Radio Access Netowrk, UTRAN overall description (Release 6), www.3GPP.com, Sep. 2004, pp. 1-44.

* cited by examiner

QUALITY-OF-SERVICE (QOS)-AWARE SCHEDULING FOR UPLINK TRANSMISSION ON DEDICATED CHANNELS

FIELD OF THE INVENTION

The invention relates to a method for scheduling in a mobile communication system a plurality of priority flows transmitted by a plurality of mobile terminals via a plurality of dedicated uplink channels to a base station. In this method each mobile terminal transmits at least one of said plurality of priority flows via one of said plurality of dedicated uplink channels.

Moreover, the invention relates to a base station for scheduling in a mobile communication system a plurality of priority flows transmitted by a plurality of mobile terminals via a plurality of dedicated uplink channels to the base station. Further, a mobile terminal in a mobile communication system transmitting at least one priority flow via a dedicated uplink channel to a base station is provided. The invention also addresses its implementation in hardware and software components.

TECHNICAL BACKGROUND

W-CDMA (Wideband Code Division Multiple Access) is a radio interface for IMT-2000 (international Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

Hybrid ARQ Schemes

The most common technique for error detection of non-real time services is based on Automatic Repeat request (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are heavily damaged such that almost no information is reusable self decodable packets can be advantageously used.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985). These combined values are stored in the soft buffers of respective HARQ processes.

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the Interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.

Serve order: The order in which users are served, e.g. random order (round robin) or according to channel quality (C/I or throughput based).

Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and It is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used.

Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus enhancements of the Uu interface. In the existing R99/R4/R5 system the uplink maximum data rate control resides in the RNC. By relocating the scheduler in the Node B the latency Introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-e in the following (see 3GPP TSG RAN WG1, meeting #31, Tdoc R01-030284, "Scheduled and Autonomous Mode Operation for the Enhanced Uplink"). The entities of this new sub-layer, which will be described In more detail in the following sections, may be located in user equipment and Node B. On user equipment side, the MAC-e performs the new task of multiplexing upper layer data (e.g. MAC-d) data into the new enhanced transport channels and operating HARQ protocol transmitting entitles.

Further, the MAC-e sub-layer may be terminated in the S-RNC during handover at the UTRAN side. Thus, the reordering buffer for the reordering functionality provided may also reside In the S-RNC.

E-DCH Mac Architecture at the User Equipment (UE)

FIG. 4 shows the exemplary overall E-DCH MAC architecture on user equipment side. A new MAC functional entity, the MAC-E 403, is added to the MAC architecture of ReV99/4/5. The MAC-e 405 entity is depicted in more detail In FIG. 5.

There are M different data flows (MAC-d) carrying data packets from different applications to be transmitted from UE to Node B. These data flows can have different QoS requirements (e.g. delay and error requirements) and may require different configuration of HARQ instances.

Each MAC-d flow will represent a logical unit to which specific physical channel (e.g. gain factor) and HARQ attributes (e.g. maximum number of retransmissions) can be assigned. Since MAC-d multiplexing is supported for E-DCH, several logical channels with different priorities can be multiplexed onto the same MAC-d. Therefore the data from one MAC-d flow can be fed into different Priority Queues.

The selection of an appropriate transport format for the transmission of data on E-DCH is done in the TF Selection functional entity. The transport format selection is based on the available transmit power, priorities, e.g. logical channel priorities, and associated control signaling (HARQ and scheduling related control signaling) received from Node B. The HARQ entity handles the retransmission functionality for the user. One HARQ entity supports multiple HARQ processes. The HARQ entity handles all HARQ related functionalities required. The MAC-e entity receives scheduling information from Node B (network side) via L1 signaling as shown in FIG. 5.

E-DCH MAC Architecture at the UTRAN

In soft handover operation the MAC-e entities in the E-DCH MAC Architecture at the UTRAN side may be distributed across Node B (MAC-eb) and S-RNC (MAC-es). The scheduler in Node B chooses the active users and performs rate control by determining and signaling a commanded rate, suggested rate or TFC (Transport Format Combination) threshold that limits the active user (UE) to a subset of the TCFS (Transport Format Combination Set) allowed for transmission.

Every MAC-e entity corresponds to a user (UE). In FIG. 6 the Node B MAC-e architecture is depicted in more detail. It can be noted that each HARQ Receiver entity is assigned certain amount or area of the soft buffer memory for combining the bits of the packets from outstanding retransmissions. Once a packet is received successfully, it is forwarded to the reordering buffer providing the in-sequence delivery to upper layer. According to the depicted implementation, the reordering buffer resides in S-RNC during soft handover (see 3GPP TSG RAN WG 1, meeting #31: "HARQ Structure", Tdoc R1-030247, available of http://www.3gpp.org). In FIG. 7 the S-RNC MAC-e architecture which comprises the reordering buffer of the corresponding user (UE) is shown. The number of reordering buffers is equal to the number of data flows In the corresponding MAC-E entity on user equipment side. Data and control information is sent from all Node Bs within Active Set to S-RNC during soft handover.

It should be noted that the required soft buffer size depends on the used HARQ scheme, e.g. an HARQ scheme using incremental redundancy (IR) requires more soft buffer than one with chase combining (CC).

E-DCH Signaling

E-DCH associated control signaling required for the operation of a particular scheme consists of uplink and downlink signaling. The signaling depends on uplink enhancements being considered.

In order to enable Node B controlled scheduling (e.g. Node B controlled time and rate scheduling), user equipment has to send some request message on the uplink for transmitting data to the Node B. The request message may contain status information of a user equipment e.g. buffer status, power status, channel quality estimate. The request message is In the following referred to as Scheduling Information (SI). Based on this information a Node B can estimate the noise rise and schedule the UE. With a grant message sent in the downlink from the Node B to the UE, the Node B assigns the UE the TFCS with maximum data rate and the time interval, the UE is allowed to send. The grant message is in the following referred to as Scheduling Assignment (SA).

In the uplink user equipment has to signal Node B with a rate indicator message information that is necessary to decode the transmitted packets correctly, e.g. transport block size (TBS), modulation and coding scheme (MCS) level, etc. Furthermore, in case HARQ is used, the user equipment has to signal HARQ related control Information (e.g. Hybrid ARQ process number, HARQ sequence number referred to as New Data Indicator (NDI) for UMTS Rel. 5, Redundancy version (RV), Rate matching parameters etc.)

After reception and decoding of transmitted packets on enhanced uplink dedicated channel (E-DCH) the Node B has to inform the user equipment if transmission was successful by respectively sending ACK/NAK in the downlink.

Mobility Management within Rel99/4/5 UTRAN

Before explaining some procedures connected to mobility management, some terms frequently used in the following are defined first.

A radio link may be defined as a logical association between single UE and a single UTRAN access point. Its physical realization comprises radio bearer transmissions.

A handover may be understood as a transfer of a UE connection from one radio bearer to another (hard handover) with a temporary break in connection or Inclusion/exclusion of a radio bearer to/from UE connection so that UE is constantly connected UTRAN (soft handover). Soft handover is specific for networks employing Code Division Multiple Access (CDMA) technology. Handover execution may controlled by S-RNC in the mobile radio network when taking the present UTRAN architecture as an example.

The active set associated to a UE comprises a set of radio links simultaneously involved In a specific communication service between UE and radio network. An active set update procedure may be employed to modify the active set of the communication between UE and UTRAN. The procedure may comprise three functions: radio link addition, radio link removal and combined radio link addition and removal. It should be noted that based on active set the set of Node Bs the UE is currently communicating with is identified.

The maximum number of simultaneous radio links is set to eight. New radio links are added to the active set once the pilot signal strengths of respective base stations exceed certain threshold relative to the pilot signal of the strongest member within active set.

A radio link is removed from the active set once the pilot signal strength of the respective base station exceeds certain threshold relative to the strongest member of the active set. Threshold for radio link addition is typically chosen to be higher than that for the radio link deletion. Hence, addition and removal events form a hysteresis with respect to pilot signal strengths.

Pilot signal measurements may be reported to the network (e.g. to S-RNC) from UE by means of RRC signaling. Before sending measurement results, some filtering is usually performed to average out the fast fading. Typical filtering duration may be about 200 ms contributing to handover delay. Based on measurement results, the network (e.g. S-RNC) may decide to trigger the execution of one of the functions of active set update procedure (addition/removal of a Node B to/from current Active Set).

E-DCH—Node B Controlled Scheduling

Node B controlled scheduling is one of the technical features for E-DCH which is foreseen to enable more efficient use of the uplink power resource In order to provide a higher cell throughput in the uplink and to increase the coverage. The term "Node B controlled scheduling" denotes the possibility for the Node B to control, within the limits set by the RNC, the set of TFCs from which the UE may choose a suitable TFC. The set of TFCs from which the UE may choose autonomously a TFC is in the following referred to as "Node B controlled TFC subset".

The "Node B controlled TFC subset" is a subset of the TFCS configured by RNC as seen in FIG. 8. The UE selects a suitable TFC from the "Node B controlled TFC subset" employing the Rel5 TFC selection algorithm. Any TFC in the "Node B controlled TFC subset" might be selected by the UE, provided there is sufficient power margin, sufficient data available and TFC is not in the blocked state. Two fundamental approaches to scheduling UE transmission for the E-DCH exist. The scheduling schemes can all be viewed as management of the TFC selection in the UE and mainly differs in how the Node B can Influence this process and the associated signaling requirements.

Node B controlled Rate Scheduling

The principle of this scheduling approach is to allow Node B to control and restrict the transport format combination selection of the user equipment by fast TFCS restriction control. A Node B may expand/reduce the "Node B controlled subset", which user equipment can choose autonomously on suitable transport format combination from, by Layer-1 signaling. In Node B controlled rate scheduling all uplink transmissions may occur in parallel but at a rate low enough such that the noise rise threshold at the Node B is not exceeded. Hence, transmissions from different user equipments may overlap in time. With Rate scheduling a Node B can only restrict the uplink TFCS but does not have any control of the time when UEs are transmitting data on the E-DCH. Due to Node B being unaware of the number of UEs transmitting at the same time no precise control of the uplink noise rise in the cell may be possible (see 3GPP TR 25.896: "Feasibility study for Enhanced Uplink for UTRA FDD (Release 6)", version 1.0.0, available at http://www.3gpp.org). Two new Layer-1 messages are introduced in order to enable the transport format combination control by Layer-1 signaling between the Node B and the user equipment. A Rate Request (RR) may be sent in the uplink by the user equipment to the Node B. With the RR the user equipment can request the Node B to expand/reduce the "Node controlled TFC Subset" by one step. Further, a Rate Grant (RG) may be sent in the downlink by the Node B to the user equipment. Using the RG, the Node B may change the "Node B controlled TFC Subset", e.g. by sending up/down commands. The new "Node B controlled TFC Subset" is valid until the next time it is updated.

Node B Controlled Rate and Time Scheduling

The basic principle of Node B controlled time and rate scheduling is to allow (theoretically only) a subset of the user equipments to transmit at a given time, such that the desired total noise rise at the Node B is not exceeded. Instead of sending up/down commands to expand/reduce the "Node B controlled TFC Subset" by one step, a Node B may update the transport format combination subset to any allowed value through explicit signaling, e.g. by sending a TFCS indicator (which could be a pointer).

Furthermore, a Node B may set the start time and the validity period a user equipment is allowed to transmit. Updates of the "Node B controlled TFC Subsets" for different user equipments may be coordinated by the scheduler in order to avoid transmissions from multiple user equipments overlapping in time to the extent possible. In the uplink of CDMA systems, simultaneous transmissions always interfere with each other. Therefore by controlling the number of user equipments, transmitting simultaneously data on the E-DCH, Node B may have more precise control of the uplink interference level in the cell. The Node B scheduler may decide which user equipments are allowed to transmit and the corresponding TFCS indicator on a per transmission time interval (TTI) basis based on, for example, buffer status of the user equipment, power status of the user equipment and available interference Rise over Thermal (RoT) margin at the Node B.

Two new Layer-1 messages are introduced in order to support Node B controlled time and rate scheduling. A Scheduling Information Update (SI) may be sent in the uplink by the user equipment to the Node B. If user equipment finds a need for sending scheduling request to Node B (for example new data occurs in user equipment buffer), a user equipment may transmit required scheduling information. With this scheduling information the user equipment provides Node B Information on its status, for example its buffer occupancy and available transmit power.

A Scheduling assignment (SA) may be transmitted in the downlink from a Node B to a user equipment. Upon receiving the scheduling request the Node B may schedule a user equipment based on the scheduling information (SI) and parameters like available RoT margin at the Node B. In the Scheduling Assignment (SA) the Node B may signal the TFCS Indicator and subsequent transmission start time and validity period to be used by the user equipment.

Node B controlled time and rate scheduling provides a more precise RoT control compared to the rate-only controlled scheduling as already mentioned before. However this more precise control of the interference at this Node B is obtained at the cost of more signaling overhead and scheduling delay (scheduling request and scheduling assignment messages) compared to rate control scheduling.

In FIG. 10 a general scheduling procedure with Node B controlled time and rate scheduling is shown. When a user equipment wants to be scheduled for transmission of data on E-DCH it first sends a scheduling request to Node B. $T_{prop}$ denotes here the propagation time on the air interface. The contents of this scheduling request are Information (scheduling information) for example buffer status and power status of the user equipment. Upon receiving that scheduling request, the Node B may process the obtained Information and determine the scheduling assignment. The scheduling will require the processing time $T_{schedule}$.

The scheduling assignment, which comprises the TFCS Indicator and the corresponding transmission start time and validity period, may be then transmitted in the downlink to the user equipment. After receiving the scheduling assignment the user equipment will start transmission on E-DCH in the assigned transmission time interval.

The use of either rate scheduling or time and rate scheduling may be restricted by the available power as the E-DCH will have to co-exist with a mix of other transmissions by the user equipments in the uplink. The co-existence of the different scheduling modes may provide flexibility in serving different traffic types. For example, traffic with small amount of data and/or higher priority such as TCP ACK/NACK may be sent using only a rate control mode with autonomous transmissions compared to using time and rate-control scheduling. The former would involve lower latency and lower signaling overhead.

Transport Channels and TFC Selection

In third generation mobile communication systems data generated at higher layers is carried over the air with transport channels, which are mapped to different physical channels in the physical layer. Transport channels are the services, which are offered by the physical layer to Medium Access Control (MAC) layer for information transfer. The transport channels are primarily divided into two types:

Common transport channels, where there is a need for explicit identification of the receiving UE, if the data on the transport channel is Intended for a specific UE or a sub-set of all UEs (no UE identification is needed for broadcast transport channels)

Dedicated transport channels, where the receiving UE is implicitly given by the physical channel, that carries the transport channel One example for a dedicated transport channel is the E-DCH. The data is transmitted within the transport channels during periodic Intervals, commonly referred to as transmission time Interval (TTI). A transport block is the basic data unit exchanged over transport channels, i.e. between the physical layer and MAC layer. Transport blocks arrive to or are delivered by the physical layer once every TTI. The transport format (TF) describes how data is transmitted during a TTI on a transport channel.

The transport format consists of two parts. The semi-static part indicating the Transmission Time Interval (TTI) (e.g. 10 ms, 20 ms, 40 ms, 80 ms), the Type of FEC (Forward Error Correction) coding (e.g. convolutional, turbo, none), the Channel Coding-rate (e.g. ½, ⅓) and the CRC size. The second part, the dynamic part indicates the Number of transport blocks per TTI, and Number of bits per transport blocks.

The attributes of the dynamic part may vary for every TTI, whereas the attributes of the semi-static part are changed by RRC transport channel reconfiguration procedure. For each transport channel a set of transport formats are defined, the so-called Transport Format Set (TFS). The TFS is assigned to MAC layer from RRC at transport channel set up. An uplink or downlink connection typically consists of more than one transport channel. The combination of transport formats of all transport channels is known as the Transport Format Combination (TFC). At the start of each TTI, an appropriate TFC for all the transport channels is selected. Dependent on the number of transport channels, the TFC comprises a number of TFs, which define the transport format to be used for transmitting data of the respective transport channel within a TTI.

The MAC layer selects the transport format for each transport channel on the basis of a set of transport format combinations (or TFCS for transport format combination set) assigned by RRC radio resource control unit and also selects the quantity of data of each logical channel to be transmitted on the associated transport channel during the corresponding TTI. This procedure is referred to as "TFC (Transport Format Combination) selection". For details on the UMTS TFC selection procedure see 3GPP TS 25.321, "Medium Access Control (MAC) protocol specification; (Release 6)", version 6.1.0, available at http://www.3gpp.org.

TFC selection at the UE may be carried out at the start of each reference TTI, which denotes the smallest TTI of the involved transport channels. If for example TFC selection is performed among three transport channels with a TTI length of transport channel #1 equals 10 ms and a TTI length of equal to 40 ms for transport channels #2 an #3, TFC selection is performed every 10 ms.

QoS Classes and Attributes

The nature of the information to be transmitted has a strong influence on the way this information should be transmitted. For instance, a voice call has completely different characteristics than a browsing session (internet). In 3GPP TS 23.107: "Quality of Service (QoS) concept and architecture", V6.1.0 (available at http://www.3gpp.org) the different types of information expected to be commonly transmitted over 3G are presented. In general, applications and services can be divided Into different groups, depending on how they are considered. UMTS attempts to fulfill QoS requests from the application or the user. Four different classes of services have been identified in UMTS and the following table lists their respective characteristics and foreseen applications.

|  | Conversational class | Streaming class | Interactive class | Background class |
|---|---|---|---|---|
| Fundamental characteristics | Preserve time relation (variation) between information entities of the stream Conversational pattern (stringent and low delay) | Preserve time relation (variation) between information entities of the stream | Request response pattern Preserve payload content | Destination is not expecting the data within a certain time Preserve payload content |
| Example of the application | voice | streaming video | Web browsing | background download of emails |

Apparently the Conversational class-type and the Streaming class-type traffic may have real-time constraints given, while the other classes are less or not delay critical and are for example commonly used for (interactive) best effort services or so-called background traffic.

For each of these QoS classes or bearer traffic classes, a list of QoS attributes has been defined as shown in the following table. If the QoS attributes are met, it is ensured that the message is perceived by the end user with the required quality. The QoS attributes are negotiated between the different elements of the communication chain (UE, RNC, CN elements) during the setup of a connection and depend on the type of service requested and the capabilities of the different nodes. If one of the QoS attributes is not met, the end user will certainly remark a degradation of the communication (e.g. voice deformation, connection blank, etc).

|  | Conversational class | Streaming class | Interactive class | Background class |
|---|---|---|---|---|
| Maximum bitrate | X | X | X | X |
| Delivery order | X | X | X | X |
| Maximum SDU size | X | X | X | X |
| SDU format Information | X | X | | |
| SDU error ratio | X | X | X | X |
| Residual bit error ratio | X | X | X | X |
| Delivery of erroneous SDUs | X | X | X | X |
| Transfer delay | X | X | | |
| Guaranteed bit rate | X | X | | |
| Traffic handling priority | | | X | |
| Allocation/Retention priority | X | X | X | X |
| Source statistics descriptor | X | X | | |
| Signaling Indication | | | X | |

A definition of each of these QoS attributes can be found in 3GPP TS 23.107 and is omitted herein for brevity.

During Radio Access Bearer (RAB) assignment procedure the RNC receives the parameters of the RAB to be established and in particular its QoS attributes. The CN initiates the procedure by sending a RAB ASSIGNMENT REQUEST message to the RNC. The message contains the IE "RAB Parameters", which includes all necessary parameters for RABs including QoS attributes. Upon reception of the RAB ASSIGNMENT REQUEST message, the UTRAN executes the requested RAB configuration. The CN may indicate that RAB QoS negotiation is allowed for certain RAB parameters and in some cases also which alternative values to be used in the negotiation.

The general idea behind the RAB QoS negotiation is to provide a solution in case a user is asking for a service with specified QoS requirements, but for some reasons (e.g. resources are not available) the system cannot meet the requirements precisely. In such situation a negotiation of certain RAB parameters (QoS attributes) like guaranteed bitrate or maximum bitrate is allowed by the CN in order to provide the user at least a connection with compromised QoS parameters instead of leaving the user without service.

As described before the scheduler in Node B shares the allowable uplink resources (RoT) among the users for uplink data transmission in the cell under its control. The scheduler allocates uplink resources to UEs requesting to transmit data on the uplink. During normal operation requests for uplink resources are received from various mobiles in the cell. Node B schedules the mobiles for uplink data transmission such that a higher cell throughput in the uplink and larger coverage for higher uplink data rates is achieved.

Node B allocates each UE a certain amount of uplink resources, i.e. maximum allowed TFC or maximum power, based on uplink scheduling requests sent from the UEs. These scheduling requests may for example contain information on the amount of data to be transmitted or the available transmit power. The Node B takes this information into account when scheduling. Further, the Node B may for example schedule a UE which is capable of higher throughput instead of another UE whose channel or available transmit power does not support higher throughput.

The problem which arises when only considering the maximum data rate each mobile can support is, that the Quality of Service (QoS) required by each mobile cannot be guaranteed. Although this kind of scheduling approach may require less amount of signaling for the uplink scheduling request, it does not consider any relative priorities between different services and therefore each radio bearer mapped to the E-DCH would have the same priority in the Node B scheduler.

Another problem occurs in case there are multiple services with different QoS requirements mapped to the E-DCH in one UE. When Node B receives a scheduling request from a UE with multiple radio bearers mapped to E-DCH, it is not aware for which bearer the resources are requested. Also In this case the Node B has no information on the probably significantly differing QoS for the service transported by the priority flows.

In an exemplary scenario outlining these problems, the Node B scheduler may receive scheduling requests (rate up command) from UE A and UE B. UE A has one interactive and one background RAB allocated and mapped to the E-DCH, whereas UE B has only one background application running on E-DCH. In case UE A requests more resources for the transmission of data of the interactive service it should be prioritized compared to UE B when performing scheduling due to the more stringent QoS requirements for the interactive service. However In case UE does not indicate within the scheduling request the application, the resources are requested for, Node B cannot differentiate between the 2 received scheduling requests and therefore can also not consider the QoS requirements for the different applications.

SUMMARY OF THE INVENTION

The object of the invention is to provide optimized base station controlled-scheduling functions in a mobile communication system.

Since Quality of Service (QoS) has an extremely Important and central role in $3^{rd}$ generation UMTS mobile networks, in order to provide end users with satisfying services, the QoS requirements for each UE should be also considered when performing scheduling. The Node Bs should allocate uplink resources to UEs for efficient utilization to maximize throughput in accordance with the QoS requirements of each individual mobile station. According to the current UMTS specifications a Node B is not aware of the QoS requirements of a service being transmitted on E-DCH as described before.

Therefore, one main aspect of the invention is to provide the scheduling base stations with QoS Information for respective uplink priority flows which could be for example MAC-D flows or a priority queues of the MAC entity. Further, the mobile terminals transmit data of these flows to a base station via a dedicated uplink channel. In case a mobile terminal has data of one or more priority flows ready for transmission on Its dedicated uplink channel, it may request resources on the radio interface from the base station and may indicate a priority flow of which data is transported on the dedicated uplink channel to the base station. Based on this information, the base station may associate each Indicated priority flow of which data is transported on the uplink channel to its QoS parameters and may thereby depend the scheduling of the dedicated uplink channels based on the QoS Information for the indicated priority flows, of which data is transported on the individual scheduled dedicated uplink channels.

According to one embodiment of the invention a method for scheduling in a mobile communication system a plurality of priority flows transmitted by a plurality of mobile terminals via a plurality of dedicated uplink channels to a base station is provided. Each mobile terminal may transmit data of at least one of the plurality of priority flows via one of the plurality of dedicated uplink channels. The base station may associate each of the plurality of priority flows with a set of QoS parameters, and may receive scheduling requests for at least a part of the plurality of dedicated uplink channels, wherein a scheduling request comprises a flow identifier indicating a priority flow of which data is to be transported on the respective dedicated uplink transport channel.

The base station may associate the flow identifiers of the plurality of scheduling requests with the set of QoS parameters of the respective identified priority flow and may schedule those dedicated uplink channels transporting data of priority flows for which a scheduling request has been received based on the set of QoS parameters indicated by the flow identifier.

For example, the priority flow may be a MAC-d flow or a priority queue of a mobile terminal.

In a further embodiment of the invention the base station transmits a scheduling assignment to mobile terminals from which a scheduling request has been received, wherein a scheduling assignment indicates the uplink resources allocated to the dedicated uplink channel of the respective mobile terminal.

According to another embodiment of the invention, at least one configuration message comprising the QoS parameters is received by the base station. According to a further aspect of this embodiment, the configuration message is received from a network element terminating the radio resource control signaling of at least one of the plurality of mobile terminals. This network element may be for example the serving RNC.

Moreover, each priority flow may be associated to at least one radio bearer between the respective mobile terminal and the network element terminating the radio resource control signaling and a set of QoS parameters of a radio bearer may be mapped to a set of QoS parameters of an associated priority flow. This mapping may be performed by the network element terminating the radio resource control signaling.

The mapping of QoS attributes may be feasible if it is desired to adapt particular parameters such as delay parameters of the QoS to the network topology and their use in the base station. For example, the mapping of QoS parameters comprises may take into account uplink delays on the interface between the base station and the network element terminating the radio resource control signaling. Thus, instead of signaling the delay parameter of the QoS of the radio bearer, a mapped delay parameter for the mobile terminal-to-base station path may be determined.

According to a further aspect of the embodiment, a set of QoS parameters of a priority flow is received by the base station in a radio link setup message or a radio link reconfiguration message from the network element terminating the radio resource control signaling.

Another embodiment of the invention relates to situations where multiple priority flows are multiplexed onto a single dedicated uplink channel by a mobile terminal. When data of multiple priority flows is transmitted In a transmission time interval on the dedicated uplink channel the flow identifier in a scheduling request for the single dedicated uplink channel comprises a flow identifier of the priority flow having the highest QoS demands.

In the latter case of priority flow multiplexing, it may be considered to signal for each priority flow a set of QoS parameters of the priority flow to the respective mobile terminal providing the priority flow via a dedicated channel and to take the signaled sets of QoS parameters into account when performing scheduling related functions at the mobile terminal.

The scheduling related functions may for example comprise the transmission of scheduling requests for the dedicated uplink channel and/or a transport format selection for uplink data transmission on a dedicated uplink channel. Further, a set of QoS parameters may be for example provided to a respective mobile terminal within a radio bearer setup message or a radio bearer reconfiguration message.

Generally, the QoS parameters associated to a priority flow may e.g. comprise at least one of a transfer delay, a guaranteed bit rate, a traffic handling priority, a service type identification, a traffic class and a reordering release timer of the reordering buffer in the MAC entity.

As will be explained in greater detail below, the service type identification may be of Interest for example. In this respect, another embodiment of the invention foresees to include a service type indicator in a scheduling request.

This service type identifier may for example indicate the transmission of a priority flow carrying a delay-critical service on the dedicated uplink channel. In case the service type indicator of the scheduling request indicates the transmission of a delay-critical service, the base station may consider a predetermined gain factor to be additionally applied to uplink transmission on the respective dedicated uplink channel when scheduling the mobile terminals from which a scheduling request has been received.

Further, another embodiment of the invention relates to a base station for scheduling in a mobile communication system a plurality of priority flows transmitted by a plurality of mobile terminals via a plurality of dedicated uplink channels to the base station. In this embodiment each mobile terminal transmits at least data of one of the plurality of priority flows via one of the plurality of dedicated uplink channels. The base station may comprise processing means for associating each of the plurality of priority flows with a set of QoS parameters, and communication means for receiving scheduling requests for at least a part of the plurality of dedicated uplink channels. As indicated above, a scheduling request comprises a flow identifier indicating a priority flow to be transported on the respective dedicated uplink transport channel.

The processing means may associate the flow identifiers of the plurality of scheduling requests with the set of QoS parameters of the respective identified priority flow and a scheduler of the base station may schedule those dedicated uplink channels transporting data of priority flows for which a scheduling request has been received based on the set of QoS parameters indicated by the flow identifier.

Another embodiment provides a base station comprising means adapted to perform the steps of the scheduling method according to one various embodiments and variations thereof described above.

According to a further embodiment of the invention a method for requesting uplink resources for transmissions on a dedicated uplink channel in a mobile communication system is provided. A mobile terminal may transmit at least data of one priority flow via the dedicated uplink channel to a base station wherein each priority flow is associated to a set of QoS parameters at the base station.

In the method of the present embodiment the mobile terminal may transmit a scheduling request for the dedicated uplink channel to the base station, wherein the scheduling request comprises a flow Identifier indicating a priority flow of which data is to be transported on the dedicated uplink transport channel and may receive a scheduling assignment from the base station for the dedicated uplink channel.

Moreover, a further embodiment of the invention relates to a mobile terminal in a mobile communication system transmitting at least data of one priority flow via a dedicated uplink channel to a base station, wherein each priority flow is associated to a set of QoS parameters at the base station. According to this embodiment the mobile terminal may comprise communicating means for transmitting to the base station a scheduling request for the dedicated uplink channel, and for receiving a scheduling assignment from the base station for the dedicated uplink channel. The scheduling request comprises a flow identifier indicating a priority flow of which data is to be transported on the dedicated uplink transport channel.

In another embodiment of the invention the mobile terminal further comprises means to perform the method of requesting uplink resources according to one of the various embodiments outlined above.

Further another embodiment of the invention relates to a computer readable storage medium for storing Instructions that when executed by a processor of a base station in a mobile communication system cause the base station to schedule a plurality of priority flows transmitted by a plurality of mobile terminals via a plurality of dedicated uplink channels to a base station, wherein each mobile terminal transmits at least data of one of the plurality of priority flows via one of the plurality of dedicated uplink channels. This may be achieved by associating at the base station each of the plurality of priority flows with a set of QoS parameters, receiving at the base station scheduling requests for at least a part of the plurality of dedicated uplink channels, wherein a scheduling request comprises a flow identifier indicating a priority flow of which data is to be transported on the respective dedicated uplink transport channel, associating by the base station the flow identifiers of the plurality of scheduling requests with the set of QoS parameters of the respective identified priority flow and scheduling by the base station those dedicated uplink channels transporting priority flows for which a scheduling request has been received based on the set of QoS parameters indicated by the flow identifier.

The computer readable storage medium according to another embodiment of the invention may further store instruction that when executed by the processor cause the base station to perform the steps of the scheduling method according to one of the various embodiments and variations thereof outlined above.

Even another embodiment of the invention provides a computer readable storage medium for storing instructions that when executed by a processor of a mobile terminal in a mobile communication system cause the mobile terminal to request uplink resources for transmissions on a dedicated uplink channel, wherein the mobile terminal transmits at least data of one priority flow via the dedicated uplink channel to a base station, and wherein each priority flow is associated to a set of QoS parameters at the base station. This may be achieved by transmitting to the base station a scheduling request for the dedicated uplink channel, wherein the scheduling request comprises a flow identifier indicating a priority flow of which data is to be transported on the dedicated uplink transport channel and receiving a scheduling assignment from the base station for the dedicated uplink channel.

The computer readable storage medium according to another embodiment further stores instruction that when executed by the processor cause the mobile terminal to perform the steps of the method of requesting uplink resources according to one of the various embodiments and variations thereof outlined above.

BRIEF DESCRIPTION OF THE FIGURES

In the following the invention is described in more detail in reference to the attached figures and drawings. Similar or corresponding details In the figures are marked with the same reference numerals.

DETAILED DESCRIPTION OF THE INVENTION

The following paragraphs will describe various embodiments of the invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

The ideas and principles that will be outlined in the subsequent sections may be applicable to mobile communication systems providing uplink data transmissions on dedicated uplink channels and in which base stations provide scheduling functions to the mobile terminals of their respective cells.

As indicated above, the invention may be for example suitable for being employed in a UMTS mobile communication system for uplink transmissions on an enhanced dedicated channel (E-DCH).

For an efficient scheduling in accordance with the QoS requirements of each user a Node B requires Information on QoS characteristics of radio bearers mapped to the E-DCH and the UE needs to indicate the scheduler in the Node B for which application uplink resources are requested in order to allow for QoS differentiation between different UEs. Based on this information the scheduler may differentiate between scheduling requests received from different UEs and prioritize UEs in order to meet the QoS requirements of the individual services transmitted on the E-DCH.

Figure 1:
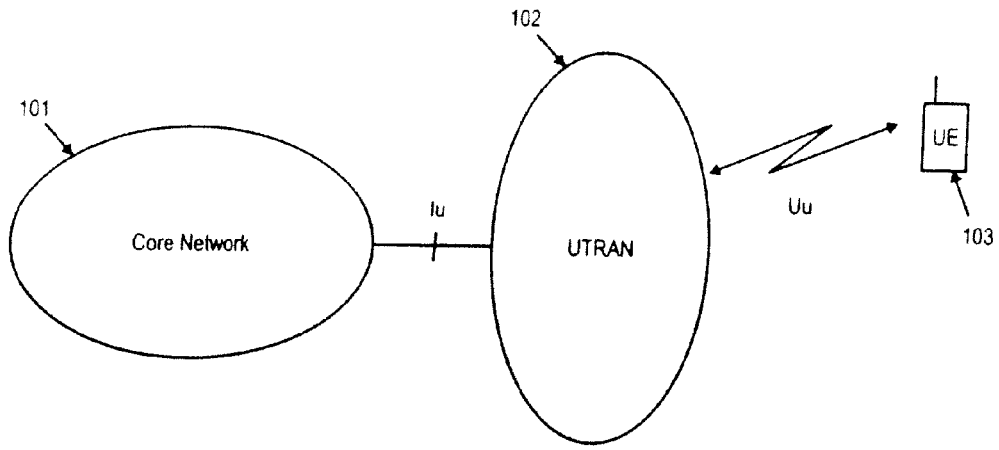
FIG. 1 shows the high-level architecture of UMTS.
Figure 2:
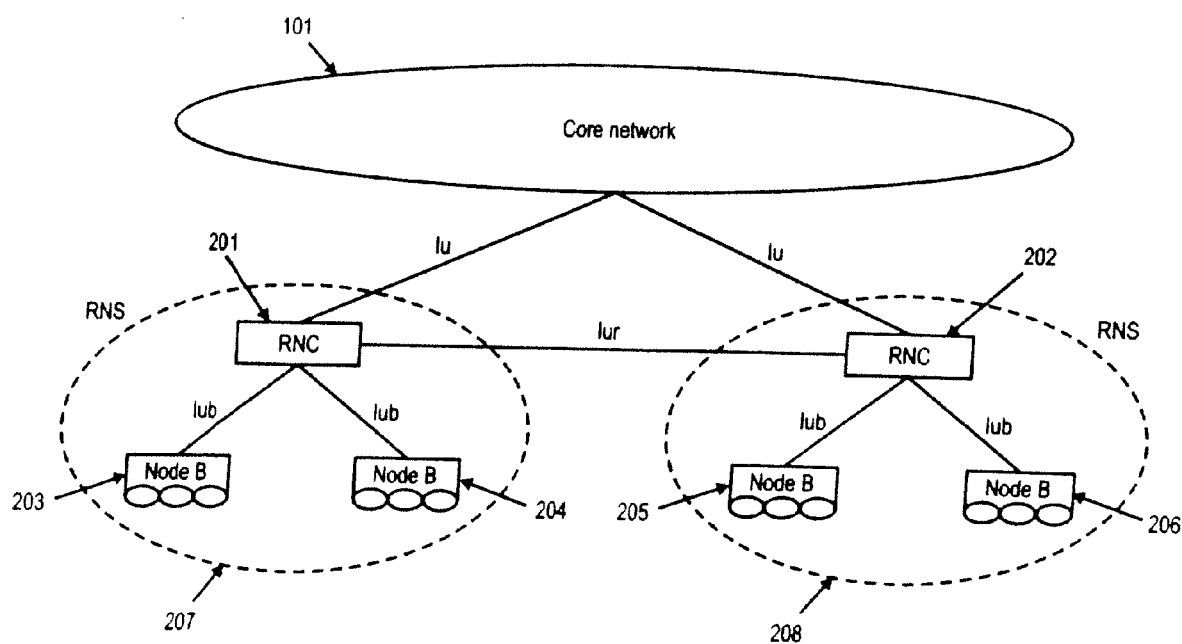
FIG. 2 shows the architecture of the UTRAN according to UMTS R99/4/5.
Figure 3:
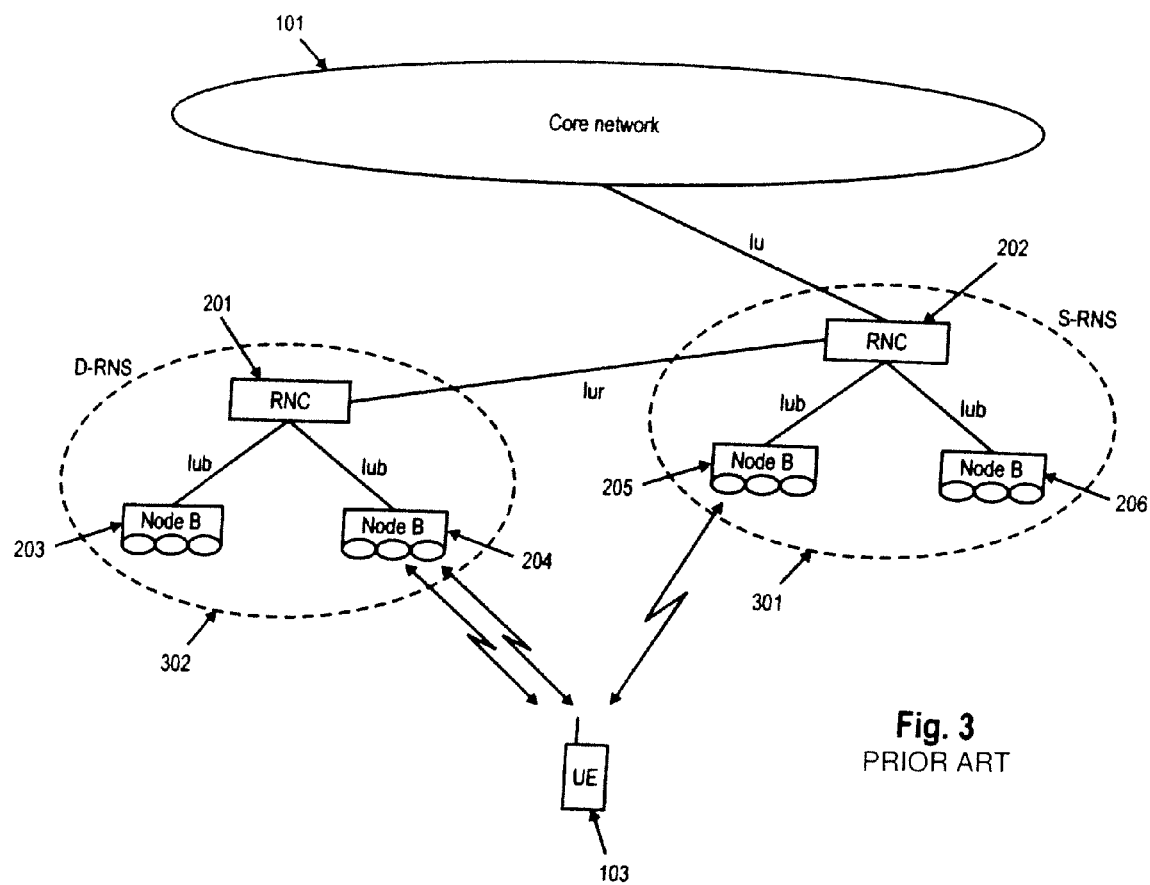
FIG. 3 shows a Drift and a Serving Radio Subsystem.
Figure 4:
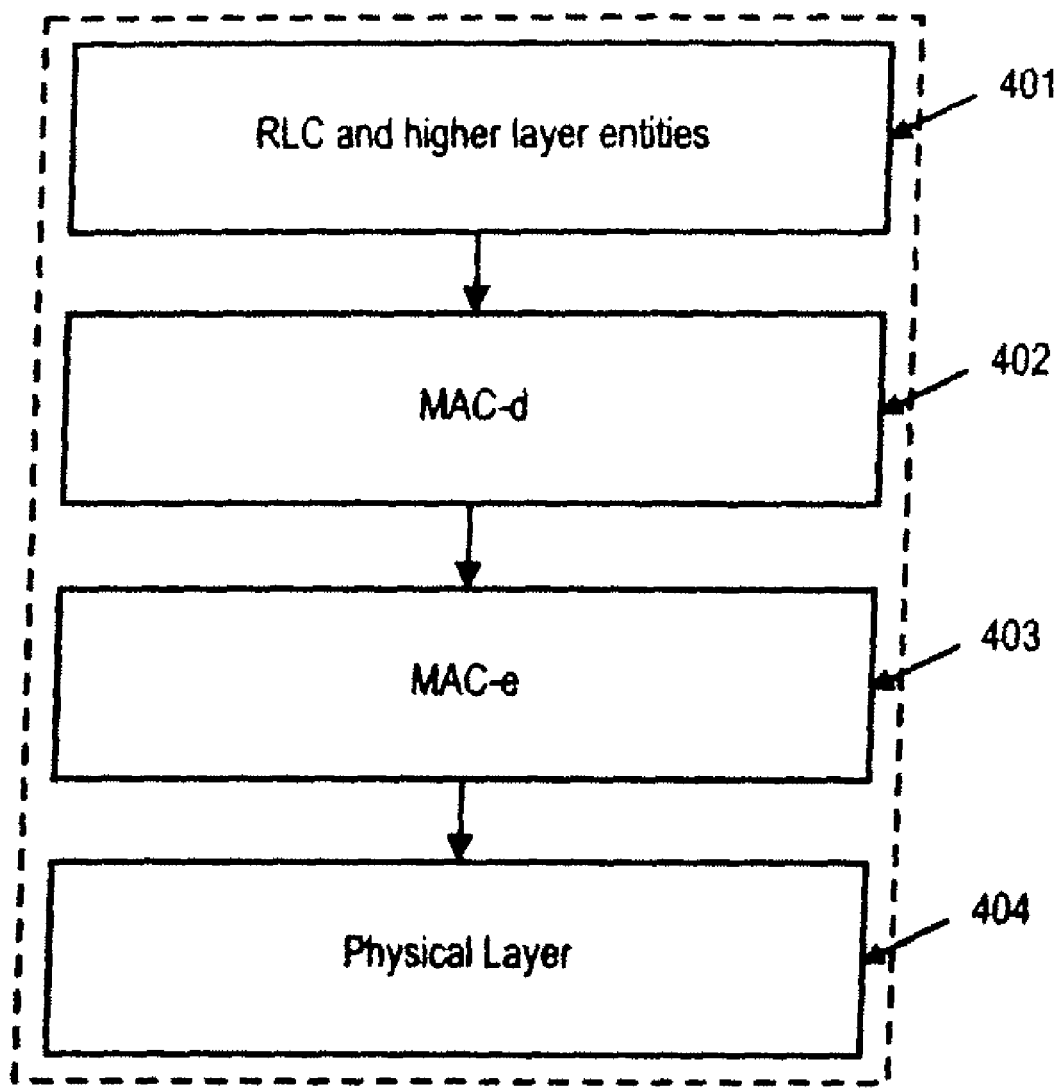
FIG. 4 shows the E-DCH MAC architecture at a user equipment.
Figure 5:
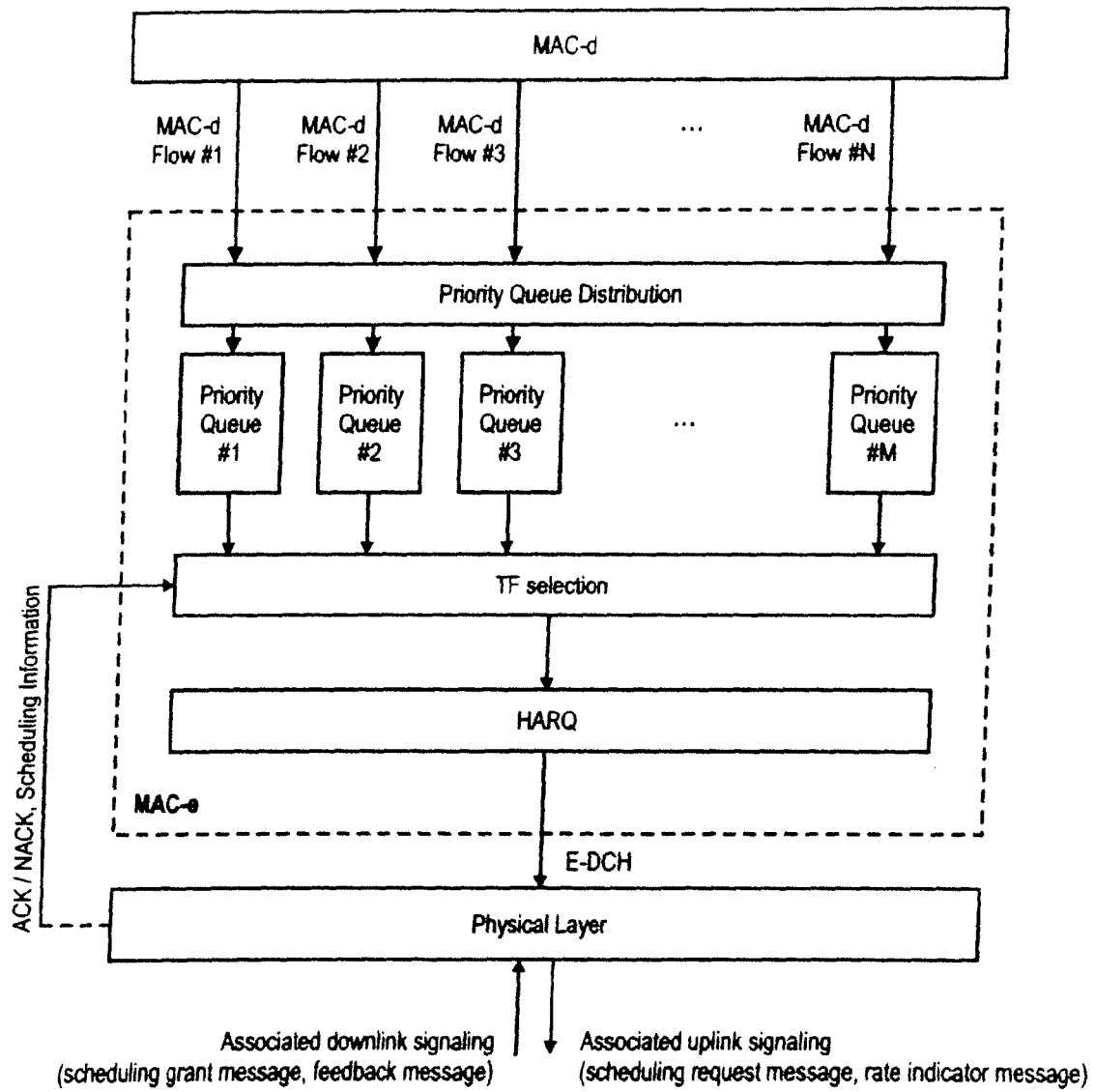
FIG. 5 shows the MAC-e architecture at a user equipment.
Figure 6:
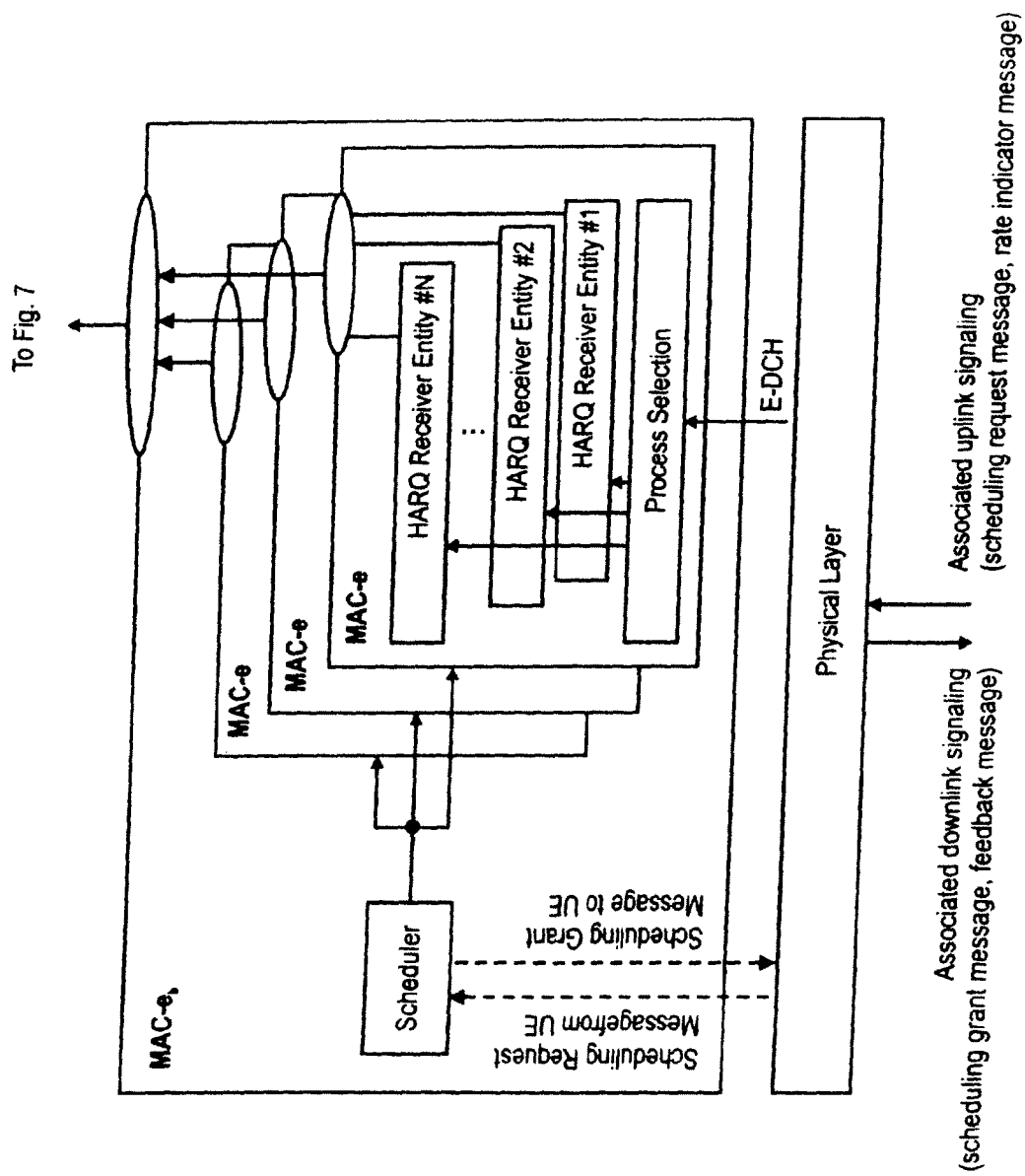
FIG. 6 shows the MAC-$e_b$ architecture at a Node B.
Figure 7:
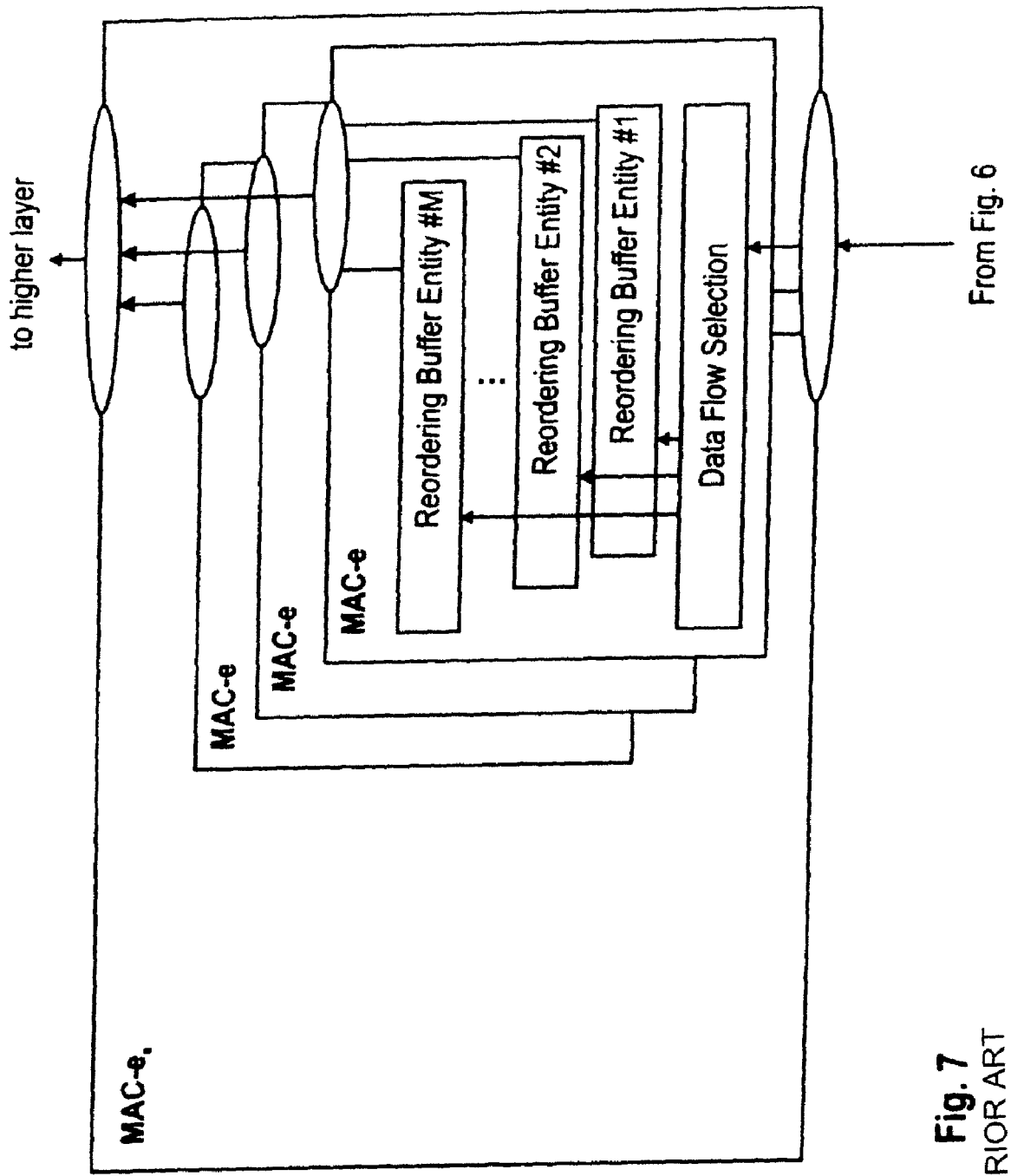
FIG. 7 shows the MAC-$e_s$ architecture at a RNC.
Figure 8:
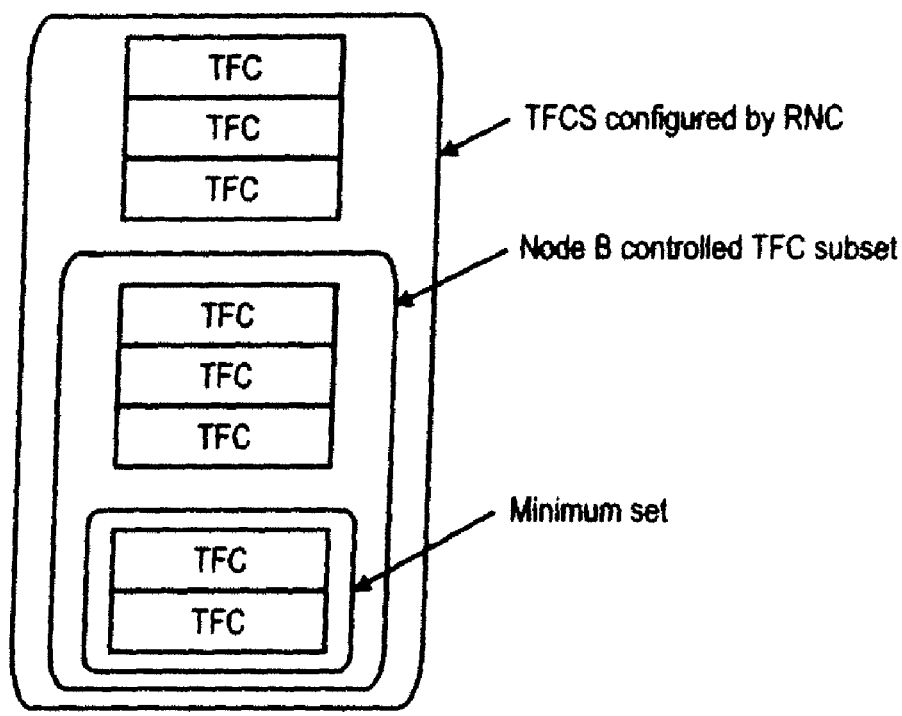
FIG. 8 shows transport format combination sets for Node B controlled scheduling.
Figure 9:
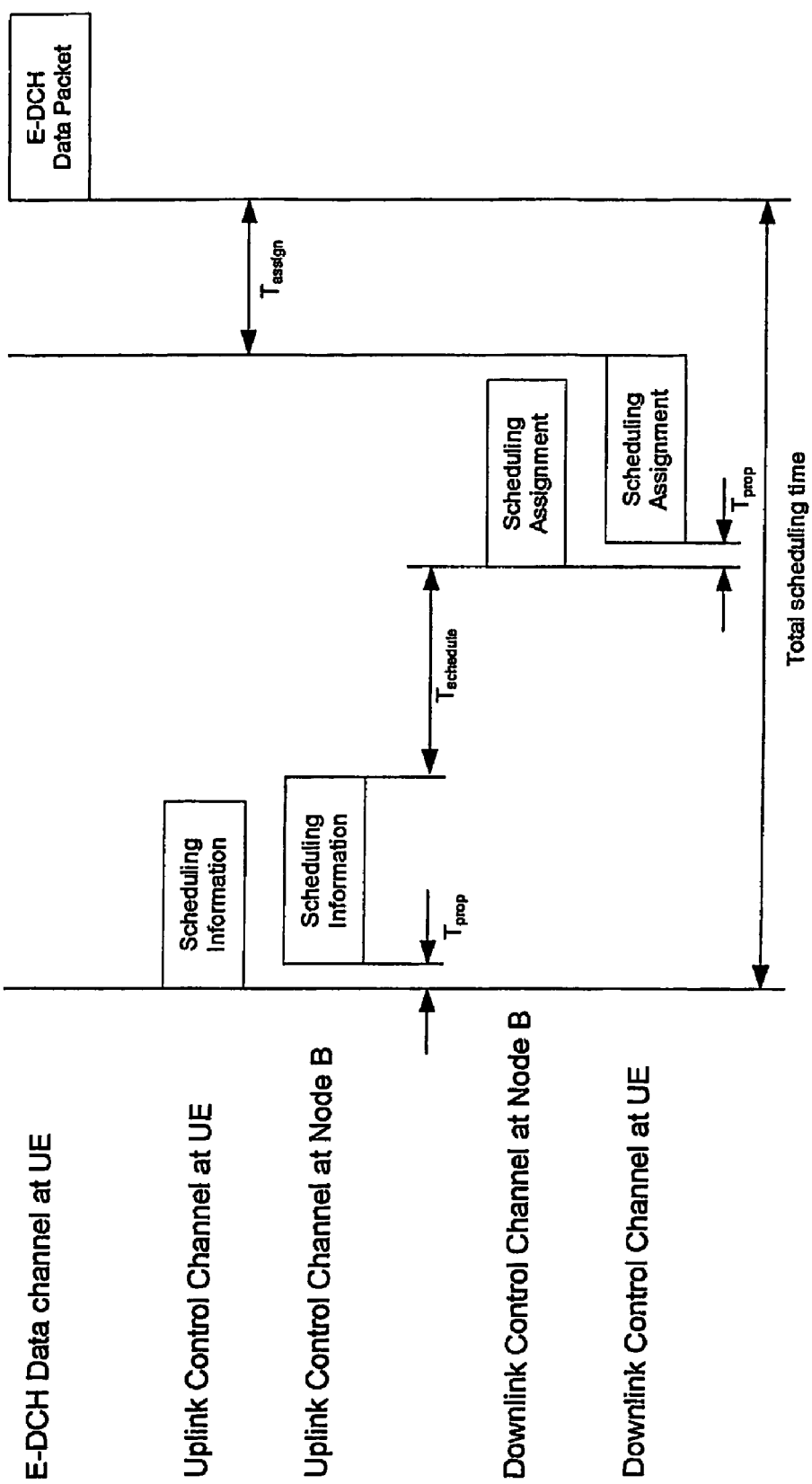
FIG. 9 shows the operation of an E-DCH In the time and rate controlled scheduling mode.

Different data flows (MAC-d flows) carrying data packets from different services (radio access bearers—RABs) may be transmitted from UE to Node B (see FIG. 5). Several logical channels may be mapped onto the same MAC-d flow, which is referred to as MAC-d multiplexing.

From a radio resource management point of view, the MAC-d flow represents the logical unit to which specific PHY/HARQ characteristics, e.g. maximum number of retransmissions or gain factor, may be assigned. Therefore, if two logical channels are mapped onto the same MAC-d flow they will be provided the same transmission parameters from lower layer perspective. Each MAC-d flow may be distributed into multiple priorities queues, for example in case several logical channels with different priorities are multiplexed onto the same flow.

The radio access network may configure the mapping of the logical channels onto the corresponding MAC-d flows and priority queues during radio bearer setup. The radio bearer configuration should be chosen such that each priority queue represents some QoS characteristics, which could be also referred to as priority class. It should be noted that MAC-d flows and priority queues are also be referred to as priority flows within this document.

According to one embodiment of the invention, in order to allow for QoS aware scheduling, the S-RNC may signal the QoS characteristics associated with each priority queue to the scheduling Node B. Certain QoS parameter could be associated to the priority queues used for uplink data transmission. Possible QoS attributes, which could be considered in the Node B for scheduling are:

Transfer delay
Guaranteed bit rate
Traffic handling priority
Traffic class
Reordering release timer T1

It should be noted, that some of the QoS attribute values, which are signaled to the Node B, might need to be adapted to an operable value, i.e. QoS attribute mapping may be feasible for some attributes between different bearer services.

For example when a UMTS bearer and the underlying radio access bearer is established, the requested transfer delay attribute does not have the same value on UMTS level (UE↔CN) as the corresponding attribute on Radio Access Bearer level (UE↔RNC), as the transport through the core network will already imply some delay and thus already uses a part of the acceptable delay.

Therefore the transfer delay attribute does not have the same value on radio bearer level (UE↔RNC) compared to the transfer delay value between UE and Node B. Thus, the RNC may map the delay value on the radio bearer level to a transfer delay value between UE and Node B before signaling same to the Node B, the Iub/Iur delay between RNC and Node B is considered in the mapping of transfer delay values.

According to one exemplary definition, the delay attribute (transfer delay) indicates the maximum delay for $95^{th}$ percentile of the distribution of delay for all delivered MAC-e SDUs between UE and Node B. The setting of the transfer delay attribute value is an implementation issue.

For example, one possible implementation may be to set the transfer delay attribute to the same value as the discard timer, which is used in the UE. The discard timer defines here the "lifetime" of a MAC-e SDU, starting from the instance of its arrival into the priority queue or transmission buffer. Upon elapse of the timer the UE may discard the MACE SDU from the priority queue or transmission buffer. This delay attribute may be considered when differentiating between different scheduling requests from different UEs.

Another possible QoS parameter that may be signaled to the Node B is the reordering release timer. The reordering release timer controls the stall avoidance in the reordering buffer. The value of the reordering release timer may be configured by upper layers.

A signaling message for providing QoS attributes associated to a priority flow from the S-RNC to the Node B e.g. via NBAP signaling is the RADIO LINK SETUP REQUEST message. The QoS attributes of the priority flows may also be signaled to Node B through a RADIO LINK RECONFIGURATION REQUEST message, which is sent from S-RNC to Node B. An exemplary information element (IE) comprising the QoS information, could look like the following:

| IE/Group Name | Presence | Range | Semantics Description |
|---|---|---|---|
| E-DCH MAC-d Flow Specific Information | | 1 ... <maxnoof MACdFlows> | |
| >E-DCH MAC-d Flow ID | Mandatory | | |
| >Allocation/ Retention Priority | Mandatory | | |
| >Binding ID | Optional | | Shall be ignored if bearer establishment with ALCAP. |
| >Transport Layer Address | Optional | | Shall be ignored if bearer establishment with ALCAP. |
| Priority Queue Information | | 1 ... <maxnoof PrioQueues> | |
| >Priority Queue ID | Mandatory | | |
| >Associated E-DCH MAC-d Flow | Mandatory | | The E-DCH MAC-d Flow ID shall be one of the flow IDs defined in the E-DCH MAC-d Flow Specific Information of this IE. |
| >MAC-e Transfer delay | Optional | | |
| >MAC-e Traffic Class | Mandatory | | |
| >MAC-e Guaranteed bitrate | Optional | | |
| >MAC-e Traffic Handling Priority | Optional | | |

Based on this information Node B may differentiate the QoS requirements of different UEs i.e. different E-DCHs and may schedule the uplink transmissions accordingly in order to meet quality requirements for a particular service.

As already mentioned above, in case the UE has allocated and mapped several radio access bearers (RABs) onto the E-DCH, the UE may indicate to the scheduling Node B for which of the services (RABs) it requests uplink resources. This may be feasible because every RAB could have different QoS requirements.

For example, when considering the case of associating the QoS attributes to priority queues, the UE may signal a priority queue ID as a priority flow identifier within the scheduling request message. The Node B scheduler is provided with the QoS requirements associated to the priority queue. This may be achieved based on the control signaling received from S-RNC as outlined above.

Based on the association between QoS parameters and priority queue the Node B may take the QoS parameters of the priority queue Indicated in a scheduling request into account when performing scheduling decisions based on the different scheduling requests received from different UEs. Therefore, the UE may for example always signal the priority queue ID when making a scheduling request independent from whether using the rate controlled scheduling mode or the time and rate controlled scheduling mode.

Since the number of priority queues is restricted to a certain maximum value, the additional overhead due to the signaling of the priority queue ID in the uplink may not be critical. Assuming for exemplary purposed that the maximum number of priority queues is set to 8 t for E-DCH this would correspond to an additional overhead of 3 bits in the scheduling request message.

Figure 10:
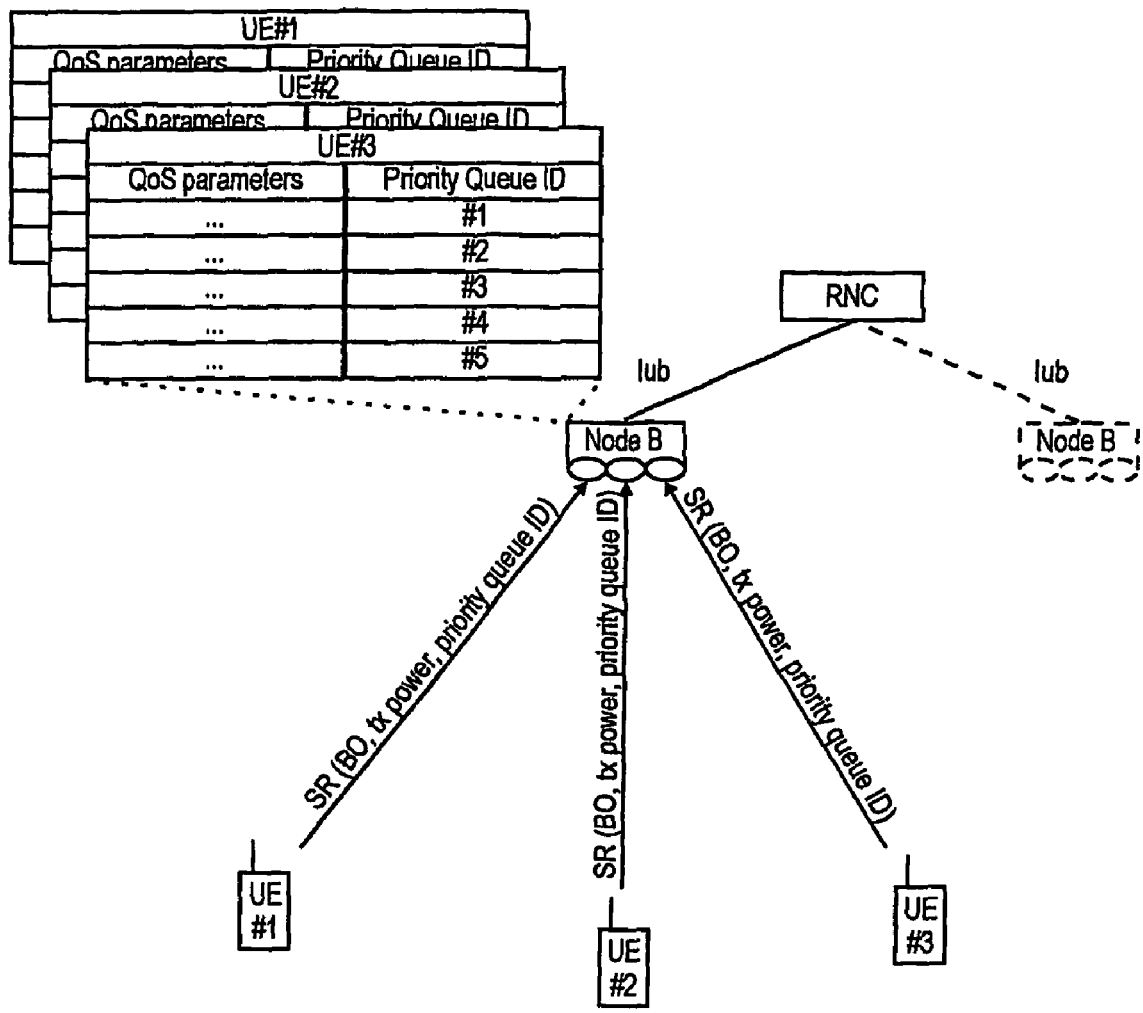
FIG. 10 shows an exemplary scenario of QoS-aware scheduling according to one embodiment of the invention.

In FIG. 10 an exemplary situation is shown were three UEs send scheduling requests to the scheduling Node B. The scheduling requests contain information on the priority queue ID of the priority queue, in which the uplink data to be transmitted is stored. Further, the scheduling request may for example indicate the UE's buffer occupancy (BO) and the available transmit power (Tx power). According to one embodiment, the scheduling requests are provided to the Node B via MAC control signaling. For example, the scheduling request may be conveyed In a MAC-e control PDU. This would have the advantage that the transmission of scheduling requests is handled by the HARQ protocol and thus their successful delivery may be ensured.

Since Node B knows the QoS requirements associated to the indicated priority queues of the UEs, it may differentiate between the different QoS requirements of the UEs and can perform scheduling accordingly. Hence, for example if the priority queue of UE #1 indicated in the scheduling request is used for the transmission of delay-sensitive service data (e.g. streaming data) the associated QoS parameters may indicate high demands in terms of allowable delay for data transmission. If the other UEs only have to transmit data of a background service without having any delay requirements in their associated QoS parameters specified, but the available uplink resource to allocate by the Node B is not sufficient for transmitting the data from all three UEs, the Node B may decide to schedule only the UE #1 having the most demanding QoS requirements.

Though the exemplary examples above relate to the association of the QoS parameters and priority queues it is apparent, that also an association between QoS parameters and MAC-d flows may be foreseen. Similar to the examples above, the UE may Identify the MAC-d flow data of which is to be transmitted on the E-DCH in the scheduling request provided to the Node B. This may also imply that reordering is done per MAC-d flow and not per priority queue. For example the MAC-d flow ID may be used in this scenario to identify a respective MAC-D flow.

Another embodiment of the invention considers the situation in which data from different priority queues or different MAC-d flows are multiplexed to form a MAC-e PDU. For example this operation may be beneficial to provide a better frame fill efficiency e.g. when employing a TTI of 10 ms i.e. in situations where the frames can get quite large.

By allowing the multiplexing of data from different MAC-d flows in one TTI questions are raised with regard to the selection of the transmission parameters (maximum number of retransmissions, gain factor) for the corresponding TTI and the QoS support by Node B scheduler. Since there is only one E-DCH transport channel, it is only possible to associate one set of QoS parameters for one TTI though different MAC-d flows with different QoS requirements have been multiplexed. The same problem may occur if priority queues are multiplexed by the TF selection entity of the UE's MAC entity.

Therefore from the transmission configuration point of view, one solution of this problem may be to always choose the transmission parameters that satisfy the QoS requirements which are the most demanding QoS requirements of all multiplexed priority flows.

However it should be noted that aligning the transmission parameters of the E-DCH transport channel to those of the most demanding application might have significant impact the system performance.

The same approach could be used with regards to scheduling in accordance to the QoS requirements of each application/service. In case data from different priority queues or MAC-d flows is multiplexed in one MAC-e PDU, Node B may schedule the UE such, that the QoS requirements of the most demanding priority queue or MAC-d flow are taken Into account when performing scheduling. That means that UE may signal the priority queue ID or the MAC-d low ID of the data from the most demanding application to Node B within the scheduling request.

The scheduler in the Node B may prioritize among different received scheduling requests from different UEs based on the QoS requirements associated to the signaled priority queue ID or MAC-d flow ID respectively.

In an exemplary embodiment above the signaling of QoS attributes associated to priority queues or MAC-d flows from S-RNC to Node B via control signaling has been discussed. According to the current UMTS specifications, Quality of Service (QoS) requirements are only known on the non-access stratum (NAS) level at UE. In other words, the UE is only aware of QoS requirements on the application level.

The QoS of a particular service is presently negotiated between the UE and the CN during PDP context activation. The IE "Quality of Service" is contained in the Activate PDP Context Request message and Activate PDP Context Accept message.

The access stratum (AS) in UE has no knowledge on the QoS requirements on the radio bearer (UE↔RNC) level. It would be beneficial for the scheduling part at UE side (e.g. sending scheduling request) if these QoS attributes were known.

Another functional entity, which could benefit from the information of the QoS parameters of a radio bearer, is the TF selection entity. According to the current specifications TFC selection is done only based on the absolute priority of a logical channel (MLP). When the QoS attributes of the different services are taken into account for TFC selection, the procedure could be improved and a phenomenon like starvation of lower priority data could be avoided.

According to a further embodiment of the invention the QoS attributes, which are signaled to Node B as described above are therefore also signaled from S-RNC to UE.

This may be for example accomplished via RRC signaling for example by including the QoS parameters in a radio bearer setup message, or radio bearer reconfiguration message. Alternatively, also new signaling messages could be defined.

Another embodiment of the invention relates to the so-called 'boosted mode' uplink transmissions for E-DCH. As indicated above, the services which envisaged to be transmitted by an E-DCH are interactive, background, streaming and also conversational services like Voice-over-IP (VoIP).

For each of these classes of traffic different QoS requirements are defined. The conversational class for example has stringent delay requirements. Therefore depending on the QoS service class the transmission parameters of an uplink data transmission are different.

Data of a delay critical service (Voice over IP) may be for example transmitted with a higher transmission power (HARQ operation point) in order to avoid a huge number of retransmission and the inherited delay. The UE may calculate a gain factor for each TFC (transport format) used for uplink data transmission wherein the gain factor denotes the power offset from the DPCCH. Alternatively the gain factor may be explicitly set by signaling from the UTRAN.

The so-called 'boosted mode' for uplink transmission may be used for the transmission of very delay critical data. The transmission boost is achieved by some additional gain factor (power offset) for the uplink data transmission which is applied in this mode. The gain factor for the 'nominal mode' is the calculated or explicitly set gain factor for each TFC as described before.

Thus, when transmitting in the 'boosted mode' the applied gain factor for the E-DPDCH(s) is:

gain factor associated to the TFC+additional gain factor or in other words gain factor associated to the TFC+boosted gain factor.

The boosted gain factor may for example be some constant value signaled to the UE by the UTRAN.

When setting up a radio bearer between UE and UTRAN by a Radio Bearer Setup message, the UTRAN may indicate whether the radio bearer should be transmitted in the 'boosted mode' or in the 'nominal mode'.

The scheduler in Node B shares the available cell resources among the UE under Its control for uplink data transmissions. Basically Node B controls the maximum data rates a UE is allowed to transmit on E-DCH.

For an efficient resource allocation it may thus be feasible if the Node B is aware whether a UE is transmitting in the 'boosted mode' or 'nominal mode'. When UE is transmitting in 'boosted mode' more uplink resources are required for uplink transmission of the UE for the same data rate compared to a transmission in the 'nominal mode' due to applying the boosted gain factor. Therefore UE may indicate its operation mode with the scheduling request.

According to this embodiment, the transmission mode of the UE is considered an QoS parameter associated to the a priority flow. Thus, the QoS parameters at the Node B may further indicate whether its associated priority flow requires transmissions in 'boosted mode' or in 'nominal mode'. When signaling the QoS requirements associated to a priority queue or MAC-d flow to the Node B, the S-RNC may thus include an IE "transmission mode" to the QoS parameters denoting whether data of this priority queue or MAC-d flow is transmitted in 'nominal mode' or 'boosted mode'.

By sending the priority queue ID or MAC-d flow ID within the scheduling request as outlined in the different embodiments above, the Node B could determine the transmission mode of the particular UEs and may schedule uplink transmissions accordingly.

Alternatively, according to another aspect of this embodiment, the transmission mode may for example be explicitly indicated in the scheduling request by a one-bit flag "transmission mode". Thereby, the transmission mode could be toggled by the UE, for example based on a buffer fill status. For exemplary purposes it may be assumed that UE running delay-critical services are allowed to use the 'boosted mode' for data transmission of the delay-critical services on E-DCH. However, the UEs themselves may decide whether to use 'boosted mode' or 'nominal mode' for the transmission of data from this priority flows. For example the decision on whether to use 'boosted mode' or not may be based on buffer occupancy, e.g. RLC buffer fill status or priority queue fill status.

Initially it may be assumed that the UE is allocated sufficient resources to meet the QoS requirements of the delay-critical service in 'nominal mode' operation. In case the UE's buffer fill status is low, HARQ retransmissions of PDUs may introduce an acceptable delay for a particular delay-critical service.

However, when assuming that the data rate allocated to a UE is approximately constant, an Increase of the buffer fill status implies an additional delay for PDUs before the UE may transmit same. Thus, the additional delay resulting from retransmissions may become unacceptable when trying to meet the QoS constraints for the service. Therefore the UE may decide to switch to 'boosted mode'. Applying an additional power offset to the E-DCH transmission will also reduce the number of retransmissions required for the successful delivery of uplink PDUs. Thereby the delay implied by retransmissions may be reduced and the QoS requirements of the service may be met.

The signaling of the transmission mode to used to the UE may for example implemented by including an IE "transmission mode", which could be a one bit flag in an appropriate signaling message, such as a radio bearer setup message or a radio bearer reconfiguration message. In case the flag is set to 1, then UE knows that data of this radio bearer should be transmitted in the 'boosted mode', and may hence apply the additional power offset to uplink transmissions on this bearer.

Another solution for indicating the operation mode from the UE to the Node B may be to explicitly indicate In the scheduling request by a one-bit flag 'transmission mode' in a scheduling request as outlined above. According to this solution, the scheduling request only comprises the 'transmission mode' flag and does not indicate a priority flow to the Node B. Upon receiving the scheduling request the Node B may recognize from the scheduling request whether an additional power offset is to be applied the uplink transmission on the radio bearer and may take this information into account when scheduling uplink transmissions on the E-DCH.

In this solution it may thus not be required that the Node B is configured with QoS attributes and their mapping to priority flows. Nevertheless, "QoS-aware" scheduling may be provided when considering the uplink operation mode a QoS parameter. However, the uplink transmissions on the E-DCH may only be optimized with respect to the additional power offset to be applied to the E-DCH transmission but not with respect to other QoS parameters like transfer delay. According to another aspect of this solution the UE may be allowed to toggle the operation mode between 'boosted mode' and 'nominal mode' as outlined above.

Another possible solution for providing QoS-aware scheduling with less granularity is described in the following sections. Instead of signaling QoS attributes associated to a priority queue or MAC-d flow to the Node B, the S-RNC may assign a priority class to each radio bearer mapped to E-DCH. The classification of the radio bearers into priority classes is based on the QoS requirements of that radio bearer. The priority class could be for example an integer value between 0 and 15 where a priority class equal to 0 denotes the highest priority.

S-RNC may associates a priority class to each priority queue or MAC-d flow and signals information on this association to Node B. Based on the priority queue ID or MACE flow ID signaled within a scheduling request from UE, Node B can prioritize among different UEs based on the priority class associated thereto.

Though assigning a priority class to each priority queue or MAC-d flows requires less signaling overhead compared to the signaling of QoS attributes, Node B knows only the relative priorities between different UEs. However the detailed QoS requirements of a radio bearer are not known at Node B with this approach as indicated above.

Moreover, it should be noted that by this solution also 'boosted mode' operations may be supported, e.g. if data of priority flows to be transmitted by the UE on the E-DCH may for example be mapped to a predetermined priority class or to predetermined priority classes.

Another embodiment of the invention relates to the implementation of the above described various embodiments, variations thereof and solutions for QoS-aware scheduling using hardware and software. It is recognized that the various above mentioned methods as well as the various logical blocks, modules, circuits described above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention, variations thereof and solutions for QoS-aware scheduling may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for scheduling transmissions of a mobile terminal in the UMTS (Universal Mobile Telecommunications System), the method comprising:
   receiving at the base station from a radio network controller Quality of Service (QoS) attributes of a plurality of MAC-d flows to be multiplexed on a MAC-e flow onto a single enhanced dedicated uplink channel (E-DCH) by the mobile terminal,
   receiving a scheduling request from the mobile terminal at the base station, wherein the scheduling request (i) comprises an identifier identifying one MAC-d flow of the plurality of MAC-d flows and (ii) requests allocation of an uplink resource to the mobile terminal for transmitting data of said plurality of MAC-d flows to be multiplexed onto the dedicated uplink channel,
   determining at the base station, based on the identifier within the scheduling request received from the mobile terminal and the QoS attributes received from the radio network controller, the QoS attributes associated with the one MAC-d flow identified by the identifier within the scheduling request by associating the identifier with the QoS attributes of the plurality of MAC-d flows received from the radio network controller, and
   scheduling by the base station the uplink resource for transmission of data of said plurality of MAC-d flows to be multiplexed onto the dedicated uplink channel by said mobile terminal, based on the identifier identifying said one MAC-d flow of said plurality of MAC-d flows and said QoS attributes that are determined by said determining operation and that are associated with the one MAC-d flow identified by the identifier within the scheduling request.

2. The method according to claim 1, wherein each MAC-d flow of said plurality of MAC-d flows has a priority.

3. The method according to claim 1, wherein the QoS attributes of a respective MAC-d flow of said plurality of MAC-d flows comprise a transmission mode associated with the data of the MAC-d flow.

4. The method according to claim 3, wherein the transmission mode indicates whether data of a respective MAC-d flow of said plurality of MAC-d flows is to be transmitted applying an additional gain factor.

5. The method according to claim 1, wherein the scheduling request further comprises information on a buffer occupancy at the mobile terminal and on a transmission power at the mobile terminal.

6. The method according to claim 1, wherein the scheduling request received by the base station is transmitted via Medium Access Control (MAC) control signaling.

7. The method according to claim 1, wherein scheduling by the base station comprises transmitting a scheduling assignment from the base station to the mobile terminal, wherein the scheduling assignment indicates the uplink resource allocated to the mobile terminal for transmission of the data of said plurality of MAC-d flows to be multiplexed onto the dedicated uplink channel by said mobile terminal.

8. The method according to claim 1, wherein the QoS attributes are received from a network element terminating the radio resource control signaling of the mobile terminal.

9. The method according to claim 8, wherein the QoS attributes are included in a configuration message.

10. The method according to claim 8, wherein the QoS attributes are received by the base station from the radio network controller in a radio link setup message or a radio link reconfiguration message.

11. The method according to claim 8, wherein the QoS attributes are received from a serving radio network controller.

12. The method according to claim 1, wherein the plurality of MAC-d flows are associated to respective radio bearers between the mobile terminal and radio network controller and the method further comprises mapping QoS attributes of the radio bearers to the QoS attributes of the respective associated MAC-d flow.

13. The method according to claim 12, wherein the mapping of the QoS attributes comprises taking into account uplink delays on the interface between the base station and the radio network controller.

14. The method according to claim 1, wherein the identifier comprised in the scheduling request identifies the highest priority MAC-d flow.

15. The method according to claim 14, wherein the highest priority MAC-d flow has the highest QoS demands.

16. The method according to claim 1, wherein the QoS attributes comprise at least one of a transfer delay, a guaranteed bit rate, a traffic handling priority, a service type identification, a traffic class and a reordering release timer of the reordering buffer in the Medium Access Control (MAC) entity.

17. The method according to claim 1, wherein the scheduling request further comprises a service type indicator indicating that data of one MAC-d flow of said plurality of MAC-d flows to be multiplexed onto the dedicated uplink channel is delay-critical.

18. The method according to claim 1, further comprising considering a predetermined gain factor to be additionally applied to the transmission when scheduling the mobile terminal.

19. The method according to claim 1, wherein the scheduling request requests allocation of an uplink resource to the mobile terminal for transmitting data of said plurality of MAC-d flows multiplexed to a protocol data unit (PDU) on the dedicated uplink channel.

20. The method according to claim 19, wherein the PDU is a MAC-e PDU.

21. A base station for scheduling a plurality of transmissions of a mobile terminal in the UMTS (Universal Mobile Telecommunications System), said base station comprising:
a communication section adapted to receive from a radio network controller Quality of Service (QoS) attributes of a plurality of MAC-d flows to be multiplexed on a MAC-e flow onto a single enhanced dedicated uplink channel (E-DCH) by a mobile terminal, and further adapted to receive a scheduling request from the mobile terminal, wherein the scheduling request (i) comprises an identifier identifying one MAC-d flow of the plurality of MAC-d flows and (ii) requests allocation of an uplink resource to the mobile terminal for transmitting data of said plurality of MAC-d flows to be multiplexed onto the dedicated uplink channel,
a determining section configured to determine, based on the identifier within the scheduling request received from the mobile terminal and the QoS attributes received from the radio network controller by associating the identifier with the QoS attributes of the plurality of MAC-d flows received from the radio network controller, the QoS attributes associated with the one MAC-d flow identified by the identifier within the scheduling request, and
a scheduling section adapted to schedule the uplink resource for transmission of data of said plurality of MAC-d flows to be multiplexed onto the dedicated uplink channel by said mobile terminal, based on the identifier identifying said one MAC-d flow of said plurality of MAC-d flows and said QoS attributes of the one MAC-d flow identified by the identifier within the scheduling request as determined by the determining section.

22. The base station according to claim 21, wherein each flow of said plurality of MAC-d flows has a priority.

23. The base station according to claim 21, wherein the scheduling request further comprises information on a buffer occupancy and on a transmission power at the mobile terminal.

24. The base station according to claim 21, wherein the communication section is adapted to transmit a scheduling assignment to the mobile terminal, wherein the scheduling assignment indicates the uplink resource allocated to the mobile terminal for transmission of the data of the plurality of MAC-d flows to be multiplexed onto the dedicated uplink channel.

25. The base station according to claim 21, wherein the QoS attributes are included in a configuration message.

26. The base station according to claim 21, wherein the QoS attributes are received from a serving radio network controller.

27. The base station according to claim 21, wherein the identifier comprised in the scheduling request identifies the highest priority MAC-d flow.

28. The base station according to claim 27, wherein the highest priority MAC-d flow has the highest QoS demands.

29. The base station according to claim 21, wherein the QoS attributes comprise at least one of a transfer delay, a guaranteed bit rate, a traffic handling priority, a service type identification, a traffic class and a reordering release timer of the reordering buffer in the Medium Access Control (MAC) entity.

30. The base station according to claim 21, wherein the scheduling request further comprises a service type indicator indicating that data of one MAC-d flow of said plurality of MAC-d flows to be multiplexed for transmission on the dedicated uplink channel is delay-critical.

31. The base station according to claim 21, wherein the scheduling unit is adapted to consider a predetermined gain factor to be additionally applied to the transmission when scheduling the mobile terminal.

32. The method according to claim 31, wherein the scheduling request requests allocation of an uplink resource to the mobile terminal for transmitting data of said plurality of MAC-d flows multiplexed to a protocol data unit (PDU) on the dedicated uplink channel.

33. The method according to claim 32, wherein the PDU is a MAC-e PDU.

34. The mobile terminal according to claim 33, wherein the PDU is a MAC-e PDU.

35. The base station according to claim 21, wherein the scheduling request requests allocation of an uplink resource to the mobile terminal for transmitting data of said plurality of MAC-d flows multiplexed to a protocol data unit (PDU) on the dedicated uplink channel.

36. The base station according to claim 35, wherein the PDU is a MAC-e PDU.

37. A non-transitory computer readable storage medium for storing instructions that when executed by a processor of a base station in the UMTS (Universal Mobile Telecommunications System) cause the base station to schedule transmissions by a plurality of mobile terminals, by:
receiving at the base station from a radio network controller Quality of Service (QoS) attributes of a plurality of MAC-d flows to be multiplexed on a MAX-e flow onto a single enhanced dedicated uplink channel (E-DCH) by a mobile terminal,
receiving a scheduling request from the mobile terminal at the base station, wherein the scheduling request (i) comprises an identifier identifying one MAC-d flow of the plurality of MAC-d flows and (ii) requests allocation of an uplink resource to the mobile terminal for transmitting data of the plurality of MAC-d flows to be multiplexed onto the dedicated uplink channel, and
determining at the base station, based on the identifier within the scheduling request received from the mobile terminal and the QoS attributes received from the radio network controller by associating the identifier with the QoS attributes of the plurality of MAC-d flows received from the radio network controller, the QoS attributes associated with the one MAC-d flow identified by the identifier within the scheduling request, and
scheduling by the base station the uplink resource for transmission of data of said plurality of MAC-d flows to be multiplexed onto the dedicated uplink channel by said mobile terminal based on the identifier identifying said one MAC-d flow of said plurality of MAC-d flows and said QoS attributes that are determined by the determining operation and that are associated with the one MAC-d flow identified by the identifier within the scheduling request.

38. The non-transitory computer readable storage medium according to claim 37, wherein the scheduling request requests allocation of an uplink resource to the mobile terminal for transmitting data of said plurality of MAC-d flows multiplexed to a protocol data unit (PDU) on the dedicated uplink channel.

39. The non-transitory computer readable storage medium according to claim 38, wherein the PDU is a MAC-e PDU.

* * * * *